Figure 1:
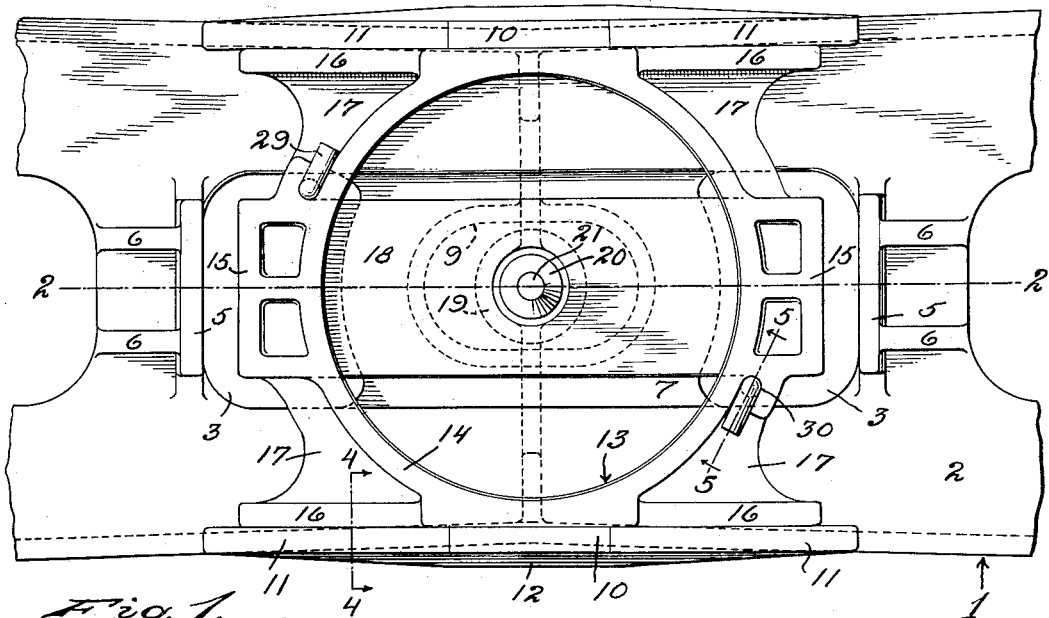

Aug. 1, 1933.  M. H. MARTIN  1,920,415

CENTER PLATE AND GUIDE STRUCTURE

Filed Oct. 15, 1927  2 Sheets-Sheet 1

Witness
John Milton Jester

Inventor
Mark H. Martin
By
his Attorney

Aug. 1, 1933.   M. H. MARTIN   1,920,415
CENTER PLATE AND GUIDE STRUCTURE
Filed Oct. 15, 1927   2 Sheets-Sheet 2

Patented Aug. 1, 1933

1,920,415

UNITED STATES PATENT OFFICE 1,920,415

CENTER PLATE AND GUIDE STRUCTURE

Mark H. Martin, Baltimore, Md., assignor to T. H. Symington & Son, Inc., Baltimore, Md., a Corporation of Maryland Application October 15, 1927. Serial No. 226,446

17 Claims. (Cl. 105—201)

The invention relates to connections between the body and truck bolsters of a railway car and has special reference to structures of that type wherein the body bolster is capable of lateral motion with respect to the truck.

The principal object of the invention, generally stated, is to provide a truck and body bolster connection bodily shiftable with respect to the truck bolster which is provided with guides for maintaining the proper relation of the parts when lateral motion of the body bolster occurs.

An important object of the invention is to provide a structure of this character in which a standard or other king pin may be used, the pin moving with the body bolster and having a permanent relation to the member which is slidable along the truck bolster, there being consequently no dragging action on the king pin when lateral motion takes place.

Another object of the invention is to provide a connecting structure of this variety in which there is provided a relatively large clearance between the center plate carried by the body bolster for the purpose of eliminating gauging of clearances.

A further object of the invention is to provide a mounting or structure of this character in which the provision of a large clearance between the center plate makes it possible to employ longitudinal chafing guides of greater height and with greater bearing areas than would otherwise be possible, the certainty of maintaining the proper relation of the parts being thereby increased and the wear being materially decreased.

Still another object of the invention is to provide a truck bolster having mounted thereon a longitudinally shiftable member in constant embracing engagement with the body center plate so as to move with the body bolster upon the occurrence of lateral motion thereof, means being also provided on the bolster for limiting the shifting movement and taking the shock at the ends thereof.

Another object is to provide a structure of this character having means for retaining the movable member upon the truck bolster and preventing displacement and possible loss thereof during transportation or at any time prior to installation of the bolster within a truck.

The invention further contemplates the provision of a detailed construction of such character as to possess great strength and ability to withstand the shocks, jars and other strains incident to lateral motion without being unduly heavy and cumbersome, there being a judicious arrangement of reinforcing webs, ribs and the like at the points or areas subjected to greatest strain.

An additional object is to provide a structure of this character which will be comparatively simple and inexpensive to manufacture, easy to assemble, positive in action, efficient and durable in service, and a general improvement in the art.

Figure 2:
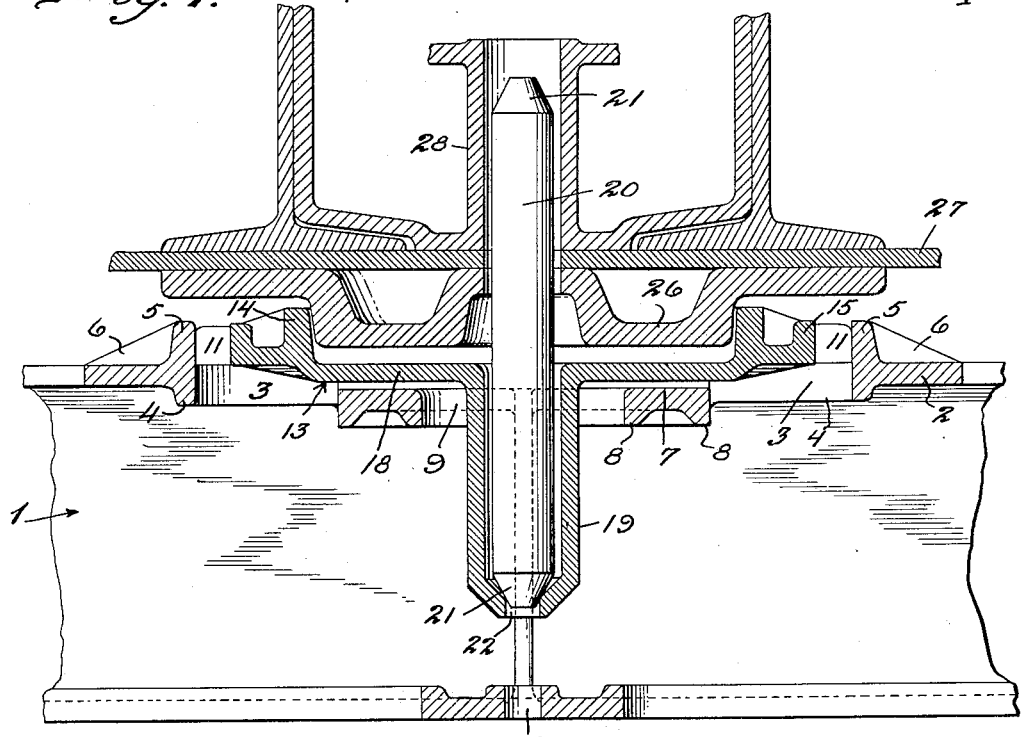
Figure 3:
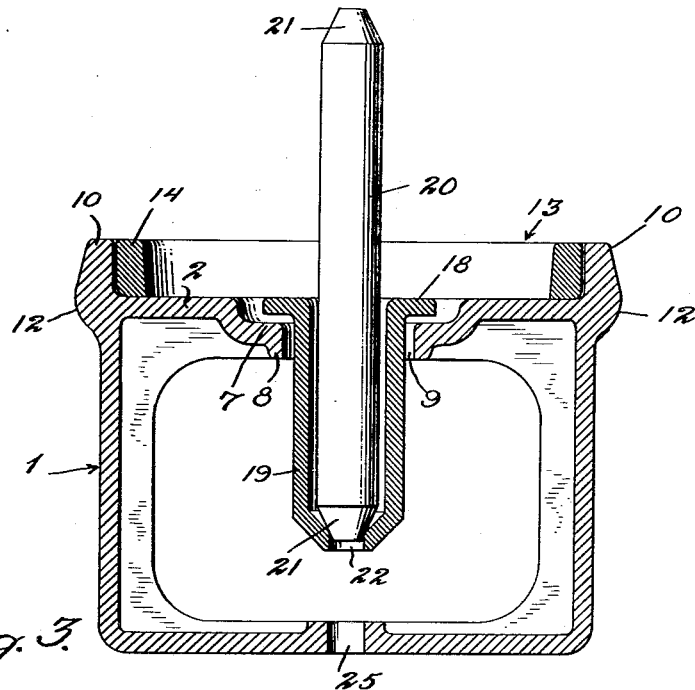
Figure 4:
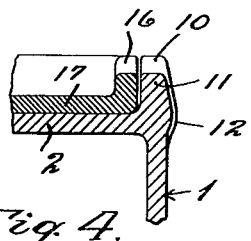
Figure 5:
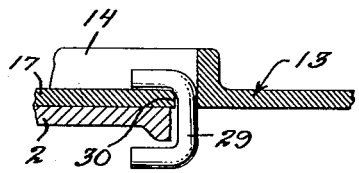
Figure 6:
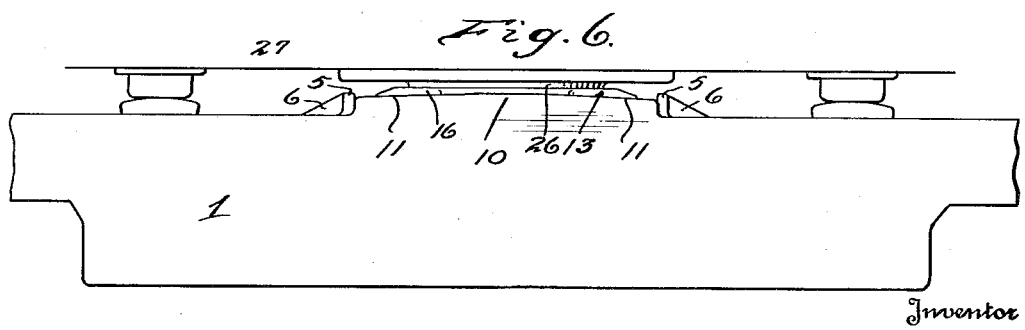

To the attainment of the foregoing and other objects and advantages, the invention preferably consists in the details of construction and the arrangement and combination of parts to be hereinafter more fully described and claimed, and illustrated in the accompanying drawings in which:

Figure 1 is a plan view of a truck bolster with the shiftable center plate engaging member mounted thereon, Figure 2 is a vertical longitudinal sectional view through the truck bolster with the movable member thereon and also through the body bolster and center plate carried thereby, the view being taken on the line 2—2 of Figure 1 with parts added, Figure 3 is a cross sectional view through the truck bolster and movable member, with the body bolster and center plate omitted but with the king pin in place, Figure 4 is a detail cross sectional view on the line 4—4 of Figure 1, Figure 5 is a detail cross sectional view taken on the line 5—5 of Figure 1, and Figure 6 is an elevation of the truck and body bolsters having my novel connection, this view illustrating the mounting of the body bolster upon side bearing rockers, the view being somewhat diagrammatic.

Referring more particularly to the drawings the numeral 1 designates, generally, the truck bolster which may be, in many respects, similar to a bolster of ordinary or conventional pattern insofar as general size and shape are concerned, the intention being that this bolster be capable of mounting within an existing truck without involving any changes or modifications in the construction thereof, there being, however, no limitation in this respect. At opposite sides of its center the top wall 2 of the bolster is provided with openings 3 at the edges of which are preferably provided depending reinforcing flanges 4. At the outer ends of the openings are upstanding abutments 5 which may conveniently be formed as ribs braced by any suitable number of webs 6 merging thereinto and into the top wall 2. These abutments 5 are preferably of considerable length and of course extend transversely of the bolster, their confronting faces being flat and preferably vertical.

At its center and between the inner edges of the openings 3 the top of the bolster has a somewhat depressed portion 7 ribbed at its underside, as at 8, for reinforcing purposes, and provided with an opening 9 which is elongated longitudinally of the bolster. The depressed portion 7 may conveniently be of substantially the same width, transversely of the bolster, as the openings 3, and is so shown though this is probably an immaterial detail, it being merely necessary that the depressed portion be of sufficient width to accommodate the king pin retainer to be described hereinafter.

At its opposite side edges the bolster is provided with upstanding flanges 10 which serve as guides for the longitudinally shiftable member to be described, and these guides may be of uniform height throughout or may have their end portions 11 inclined slightly downwardly and outwardly or away from the transverse center of the bolster. For reinforcing purposes the bolster may be thickened or bulged outwardly as at 12 at the base portions of these guide flanges or chafing guides. The confronting faces of the guide flanges are vertical and parallel.

Slidably mounted upon the top of the bolster is a guide member indicated generally at 13, this member being formed conveniently as a casting and including a ring-like body 14 at diametrically opposite points of which are lateral projections 15 located between the abutments 5 and adapted to engage thereagainst as stops. These lateral projections 15 are preferably of rib and web construction to possess strength without excessive weight. It is preferable that the ring portion 14 be of considerable height for a reason to be explained. The opposite sides of the member 13 are formed with elongated flanges 16 which extend longitudinally of the bolster and which lie substantially in engagement with the guide flanges 11 and to reinforce these flanges 16 it is preferable to provide webs 17 located between them and the projections 15 and merging thereinto and into the ring portion 14. The member 13 further includes a plate portion 18 which extends across the ring portion 14 longitudinally of the bolster and which is provided at its center with a depending tubular member or socket 19 serving as retaining means for the king pin 20 which may conveniently be of ordinary design. As the ends 21 of such a pin are usually tapered the bottom of the member 19 may be substantially correspondingly shaped and provided with openings 22 for the escape of any water or other foreign matter which might under any circumstances enter the member 19. In the present instance the bottom of the bolster is shown as having an opening 25 located beneath the opening 22 to provide a free exit for the foreign matter above referred to. The plate portion 18 is of less width than the depression 7 in the top of the bolster and is accommodated therein as clearly indicated in the drawings.

The guide member 13 above described receives the center plate 26 which is secured to and which depends from the body bolster 27 in the usual manner, there being a guide member 28 at the center of the body bolster for receiving the projecting upper end of the king pin, the center plate 26 and bottom of the bolster being of course apertured for this purpose. There is not necessarily anything distinctive or special about the construction of the center plate 26 it being, however, of course of circular or substantially cylindrical shape so as to fit properly within the ring member 14 and permit free swivelling movement of the truck and body bolsters with respect to each other.

It is highly desirable to prevent the member 13 from becoming displaced with respect to the bolster during shipment, handling or at any time prior to installation of the bolster within a truck. In accomplishing this I may provide one or more pin-like members 29 inserted through openings 30 in the member 13 and passing through the openings 3, both ends of the pin members being upset as clearly indicated in Figure 5 for the purpose of preventing withdrawal. In view of the fact that these members 29 are located at the openings 3 they cannot interfere with longitudinal shifting of the member 13 along the bolster.

In structures of the lateral motion type it is of course well known that the body bolster is supported upon side bearings so that the weight will not come upon the center of the truck bolster. A conventional mounting of this type but embodying the invention is shown in Figure 6. It will be observed that the body bolster 27 is in such position that the center plate 26 simply fits, without weight, within the confines of the ring member or portion 14. Clearly there will be the usual relative swivelling movement of the truck and body bolsters which occurs when passing over curved track, switches, etc. When lateral motion of the body bolster occurs under any circumstances it is apparent that the member 13 may slide longitudinally of the bolster until one extension 15 or the other strikes against the adjacent abutment 5 as a stop. The member 13 is effectually guided during its movement by the upstanding flanges 11. It will be noted that considerable clearance is provided beneath the center plate 26 partly for the purpose of making it unnecessary to provide any adjustment to take care of manufacturing variations and partly for the purpose of making the upstanding ring 14 and flanges 10 of considerable height in order to provide relatively large bearing areas over which wear will be distributed rather uniformly instead of being permitted to concentrate at any point or points. It will be observed that the ordinary king pin may be used and that it moves with the body bolster and member 13 without any dragging. Adequate provision has been made throughout for insuring proper strength of the parts so that they may be readily capable of withstanding the shocks and jars of service in addition to the wear resulting from friction. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a truck and body bolster combination, a connection therebetween comprising a depending center plate on the body bolster, a member mounted for sliding movement longitudinally of the truck bolster and embracingly engaging the center plate, and a king pin engaging said member and the center plate.

2. In a truck and body bolster combination, a connection therebetween comprising a depending center plate on the body bolster, a member mounted for sliding movement longitudinally of the truck bolster and embracingly engaging the center plate, and a king pin engaging said member and the center plate, said slidable member having a central depending socket receiving the pin.

3. In a truck and body bolster combination, a mounting on the former for permitting lateral motion of the latter and relative swivelling of both, comprising a member slidably mounted upon the truck bolster for movement longitudinally thereof, guide means on the truck bolster, abutment means on the truck bolster for limiting movement of said slidable member, a center plate on the body bolster, said slidable member being formed to receive the center plate, said slidable member carrying a king pin extending through the center bearing.

4. In a truck and body bolster combination, a mounting on the former for permitting lateral motion of the latter and relative swiveling of both, comprising a member slidably mounted upon the truck bolster for movement longitudinally thereof, guide means on the truck bolster, abutment means on the truck bolster at the longitudinal center thereof for limiting movement of said slidable member, a center plate on the body bolster, said slidable member being formed to receive the center plate, said slidable member being formed centrally of its opposite sides with reduced outstanding projections adapted to engage said abutment means.

5. In a truck and body bolster combination, a mounting on the former for permitting lateral motion of the latter and relative swivelling of both, comprising a member slidably mounted upon the truck bolster for movement longitudinally thereof, guide means on the truck bolster, abutment means on the truck bolster at the center thereof for limiting movement of said slidable member, a center plate on the body bolster, said slidable member being formed to receive the center plate, said slidable member including a ring portion substantially conforming to the center plate and being formed at the center of its opposite sides with projections of less width than the truck bolster merging into said ring portion and adapted to engage said abutment means.

6. In a truck and body bolster combination, a mounting on the former for permitting lateral motion of the latter and relative swivelling of both, comprising a member slidably mounted upon the truck bolster for movement longitudinally thereof, guide means on the truck bolster, the truck bolster having a central longitudinal opening in its top, abutment means on the center of the truck bolster at the ends of said opening for limiting movement of said slidable member, a center plate on the body bolster, said slidable member including a ring portion substantially conforming to the center plate and being formed at the center of its opposite sides with projections of less width than the truck bolster merging into said ring portion and adapted to engage said abutment means, said abutment means being located centrally of the bolster, and said abutment means having flat parallel faces.

7. In a truck and body bolster combination, a mounting on the former for permitting lateral motion of the latter and relative swivelling of both, comprising a member slidably mounted upon the truck bolster for movement longitudinally thereof, guide means on the truck bolster, abutment means on the truck bolster for limiting movement of said slidable member, a center plate on the body bolster, said slidable member being formed to receive the center plate, said slidable member including a ring portion and a plate portion extending longitudinally with respect to the truck bolster, the truck bolster having a portion of its top depressed to receive the plate portion of the slidable member, and means pivotally connecting the center plate and slidable member and extending therethrough.

8. In a truck and body bolster combination, a connection comprising a center plate on the body bolster carrying a king pin, a member slidably mounted on the truck bolster and formed to receive the center plate, said slidable member including a ring portion traversed by a plate portion having a depending socket at its center for the reception of the king pin, the top of the bolster having a longitudinally elongated opening for the passage of said socket.

9. In a truck and body bolster combination, a connection comprising a center plate on the body bolster carrying a king pin, a member slidably mounted on the truck bolster and formed to receive the center plate, said slidable member including a ring portion traversed by a plate portion having a depending socket at its center for the reception of the king pin, the top of the bolster having a longitudinally elongated opening for the passage of said socket, the top of the bolster having a depressed portion receiving said plate portion whereby the top surface of the plate portion will be flush with the top of the major portion of the bolster.

10. In a truck and body bolster combination, a connection comprising a center plate carried by the body bolster, a member slidable longitudinally upon the truck bolster and formed to receive said center plate, said member having upstanding flanges at its side edges, and upstanding guide flanges at the sides of the truck bolster slidably engaged by said first named flanges and merging into the truck bolster at thickened portions providing reinforcement.

11. In a truck and body bolster combination, a connection comprising a center plate carried by the body bolster, a member slidable longitudinally upon the truck bolster and formed to receive said center plate, said member having upstanding flanges at its side edges, and upstanding guide flanges at the sides of the truck bolster slidably engaged by said first named flanges, the wall of the truck bolster being outwardly bulged at the bases of the guide flanges to increase the thickness and provide reinforcement.

12. In a truck and body bolster combination, a connection comprising a center plate carried by the body bolster, a member slidably mounted for movement longitudinally upon the truck bolster and formed to receive said center plate, said slidable member including a ring portion and flanges at the opposite sides thereof merging thereinto, lateral projections on said ring portion located above the longitudinal axis of the truck bolster, abutment means on the truck bolster engageable by said projections to serve as stops, and webs merging into said flanges and into said projections.

13. In a truck and body bolster combination, a connection comprising a center plate depending from the body bolster, a member slidably mounted on the truck bolster and recessed to receive the center plate, a depending socket at the center of said slidable member, a king pin mounted within said socket and extending through the center plate, the top of the bolster having an elongated opening for the accommodation of the socket, the underside of the top wall of the truck bolster having a depending flange surrounding said opening.

14. In combination, a truck bolster, a body bolster having a center plate, load sustaining side bearing means on the truck bolster for supporting the body bolster, and a connection between the bolsters comprising a member mounted for slidable movement upon the truck bolster longitudinally thereof and formed to receive the center plate, said slidable member having a plate portion underlying the center plate and extending substantially entirely across the truck bolster.

15. In combination, a truck bolster provided with guide means thereon, a body bolster having a center plate formed with an opening, a member having limited sliding movement longitudinally of the truck bolster between the guide means thereon and formed for embracing reception of the center plate, and a king pin extending through the opening in the center plate and engaged with the center of said slidable member.

16. In a truck and body bolster combination, a connection therebetween comprising a depending center plate on the body bolster, a member receiving the center plate mounted for sliding movement longitudinally of the truck bolster, and upstanding pivot means carried by said member and extending into the center of the center plate.

17. In a truck and body bolster combination, a connection therebetween comprising a depending central member on the body bolster, a member slidably mounted on the truck bolster and embracingly receiving said member, and means pivotally connecting both members and removable therefrom.

MARK H. MARTIN.